(12) United States Patent
Matsuo et al.

(10) Patent No.: US 11,946,543 B2
(45) Date of Patent: Apr. 2, 2024

(54) PARKING MECHANISM AND METHOD OF ASSEMBLING PARKING MECHANISM

(71) Applicant: NIDEC CORPORATION, Kyoto (JP)

(72) Inventors: Hideaki Matsuo, Kyoto (JP); Mitsuhiro Hara, Kyoto (JP); Masashi Yuboku, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 18/066,283

(22) Filed: Dec. 15, 2022

(65) Prior Publication Data
US 2023/0204102 A1  Jun. 29, 2023

(30) Foreign Application Priority Data

Dec. 28, 2021  (JP) ................. 2021-213776

(51) Int. Cl.
*F16H 63/34* (2006.01)
(52) U.S. Cl.
CPC ..... *F16H 63/3416* (2013.01); *F16H 63/3466* (2013.01)
(58) Field of Classification Search
CPC ............. F16H 63/3416; F16H 63/3466; F16H 63/3425; F16H 63/3433; F16H 63/3441; F16H 63/345; F16H 63/3458; F16H 63/3475; F16H 63/3483; F16H 63/3491
See application file for complete search history.

(56) References Cited

U.S. PATENT DOCUMENTS 8,668,067 B2    3/2014  Morisawa et al.
9,441,684 B2 *  9/2016  Ishiura .................. F16D 63/006
10,352,399 B2 * 7/2019  Hudson .................... F16H 37/12
10,816,093 B2  10/2020  Sugiyama et al.
2018/0154881 A1 * 6/2018  Heubner ................. F16D 65/14
(Continued)

FOREIGN PATENT DOCUMENTS

JP    2011143893 A    7/2011
JP     202070846 A    5/2020
(Continued)

OTHER PUBLICATIONS https://www.khanacademy.org/science/physics/torque-angular-momentum/torque-tutorial/a/torque (Year: 2023).*
(Continued)

*Primary Examiner* — Stacey A Fluhart
*Assistant Examiner* — Aimee Tran Nguyen
(74) *Attorney, Agent, or Firm* — HAUPTMAN HAM, LLP

(57) ABSTRACT

A parking mechanism includes an actuator having a manual shaft rotating around the first axis, a flange provided on an outer periphery of the manual shaft, a cam rod having a coupling portion coupled to the flange and a rod body moveable along a second axis orthogonal to the first axis with a movement of the flange, a coil spring attached to the rod body, a cam that is attached to the rod body and moves along the second axis by motion of the rod body transmitting via the coil spring, a pawl member having a meshing portion and operating with a movement of the cam, and a parking gear having a tooth portion with which the meshing portion meshes. The self-holding torque of the actuator is larger than the torque applied to the manual shaft at the time of maximum compression of the coil spring.

16 Claims, 7 Drawing Sheets

(56) References Cited

U.S. PATENT DOCUMENTS

| | | | |
|---|---|---|---|
| 2019/0107196 A1 | 4/2019 | Banshoya et al. | |
| 2019/0136974 A1* | 5/2019 | Li | F16H 57/039 |
| 2020/0023818 A1* | 1/2020 | Hanker | F16H 57/00 |
| 2020/0200251 A1* | 6/2020 | Roussel | H02K 7/116 |
| 2020/0307527 A1* | 10/2020 | Saito | H02P 3/025 |

FOREIGN PATENT DOCUMENTS

| | | |
|---|---|---|
| JP | 202085223 A | 6/2020 |
| JP | 2020153436 A | 9/2020 |

OTHER PUBLICATIONS https://www.khanacademy.org/math/cc-seventh-grade-math/cc-7th-geometry/cc-7th-angles/a/complementary-and-supplementary-angles-review (Year: 2023).*
https://calcworkshop.com/triangle-trig/sohcahtoa/ (Year: 2020).*
https://www.dummies.com/article/academics-the-arts/math/geometry/definitions-and-theorems-of-parallel-lines-187739/ (Year: 2016).*

* cited by examiner

PARKING MECHANISM AND METHOD OF ASSEMBLING PARKING MECHANISM

CROSS-REFERENCE TO RELATED APPLICATIONS

The present invention claims priority under 35 U.S.C. § 119 to Japanese Patent Application No. 2021-213776 filed on Dec. 28, 2021, the entire content of which is incorporated herein by reference.

FIELD OF THE INVENTION

The present invention relates to a parking mechanism and a method of assembling the parking mechanism.

BACKGROUND

A parking mechanism is mounted on a drive device that drives a vehicle. A conventional parking lock device (corresponding to a parking mechanism) operates a control cam by a drive device to mesh a locking claw of a lock pole with a parking gear.

In the conventional parking mechanism, in order to suppress the rotation of the manual shaft (drive shaft) of the actuator by the reaction force from the cam, a leaf spring that determines the rotational position of the manual shaft is provided. For this reason, in the parking mechanism having the conventional structure, there is a problem that the number of parts increases and the device is large.

SUMMARY

An aspect of an exemplary parking mechanism of the present invention includes an actuator having a manual shaft extending along a first axis and rotating around the first axis, a flange provided on an outer periphery of the manual shaft and extending along a radial direction of the first axis, a cam rod having a coupling portion coupled to the flange and a rod body extending along a second axis orthogonal to the first axis and moving along the second axis and along with a movement of the flange, a coil spring attached to the rod body, a cam that is attached to the rod body and moves along the second axis by motion of the rod body transmitting via the coil spring, a pawl member having a meshing portion and operating with a movement of the cam, and a parking gear having a tooth portion with which the meshing portion meshes. An imaginary perpendicular line is set from the first axis to the second axis when viewed in the axial direction of the first axis. The coupling portion moves around the first axis within a range of ±45° with respect to the perpendicular line. k is a spring constant of the coil spring. Xb is a maximum compression amount of the coil spring in a movable range of the rod body. R is a distance between the first axis and the coupling portion when viewed in an axial direction of the first axis. θ is an angle formed by the perpendicular line and the coupling portion when viewed in the axial direction of the first axis. Ts is a self-holding torque of the actuator. The following Formula 1 holds.

$$Ts > k \cdot Xb \cdot R \cdot \cos\theta \quad \text{(Formula 1)}$$

The above and other elements, features, steps, characteristics and advantages of the present disclosure will become more apparent from the following detailed description of the preferred embodiments with reference to the attached drawings.

DETAILED DESCRIPTION

Figure 1:
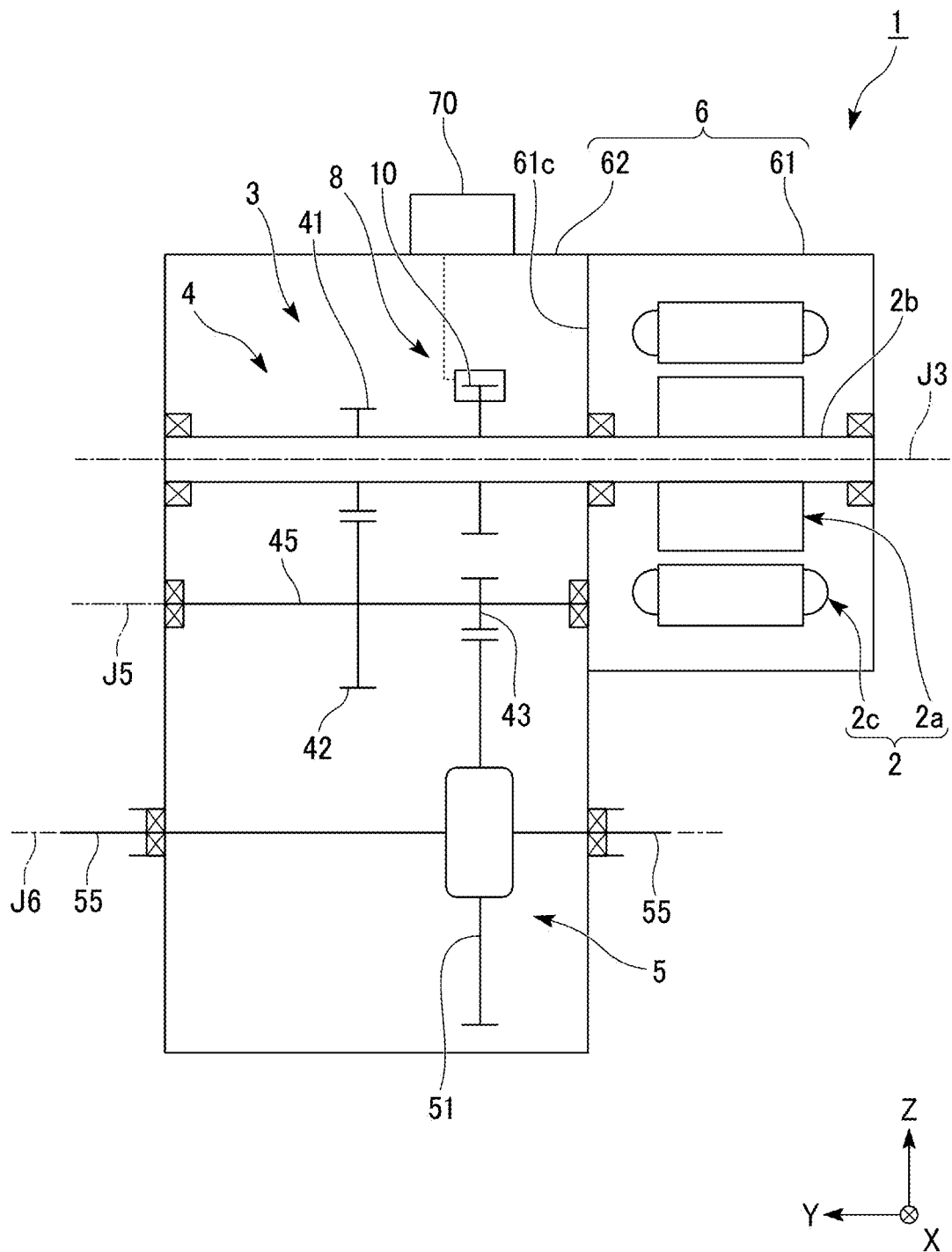
FIG. 1 is a diagram schematically illustrating a drive device of an embodiment.

In description below, a vertical direction is defined based on a positional relationship when a drive device 1 of the present embodiment is mounted on a vehicle (not illustrated) positioned on a horizontal road surface. Further, in the drawings, an XYZ coordinate system is illustrated appropriately as a three-dimensional orthogonal coordinate system.

In each drawing, a Z-axis direction corresponds to the vertical direction. A +Z side is an upper side in the vertical direction, and a −Z side is a lower side in the vertical direction. In the present embodiment, the upper side in the vertical direction will be referred to simply as the "upper side" and the lower side in the vertical direction will be simply referred to as the "lower side". An X-axis direction is a direction orthogonal to the Z-axis direction and is a vehicle front-rear direction on which the drive device 1 is mounted. In the present embodiment, a +X side is a front side of the vehicle, and a −X side is a rear side of the vehicle. A Y-axis direction is a direction orthogonal to both the X-axis direction and the Z-axis direction, and is a left-right direction of the vehicle, that is, a vehicle width direction. In the present embodiment, a +Y side is the left side of the vehicle, and a −Y side is the right side of the vehicle. The Y-axis direction corresponds to an axial direction of a third axis J3 to be described later. The vehicle front-rear direction and the left-right direction are horizontal directions orthogonal to the vertical direction. In the present embodiment, the +Y side corresponds to one side in the axial direction, and the −Y side corresponds to the other side in the axial direction. The third axis J3 appropriately illustrated in each drawing extends in the Y-axis direction, that is, the left-right direction of the vehicle.

FIG. 1 is a conceptual diagram schematically illustrating the drive device 1. The drive device 1 according to the present embodiment is mounted in a vehicle having a motor as a power source, such as a hybrid vehicle (HEV), a plug-in hybrid vehicle (PHV), and an electric vehicle (EV), and is used as a power source of the vehicle.

The drive device 1 includes a motor (power unit) 2, a gear unit (transmission mechanism) 3 including a reduction gear 4 and a differential gear 5, a parking mechanism 8, and a housing 6. The drive motor 2 drives the vehicle. The gear unit 3 is connected to the drive motor 2. The parking mechanism 8 is attached to the gear unit 3.

The housing 6 includes a motor accommodation unit 61 that accommodates the drive motor 2, a gear accommodation unit 62 that accommodates the gear unit 3 and the parking mechanism 8, and a partition 61c provided between the motor accommodation unit 61 and the gear accommodation unit 62.

The drive motor 2 rotates around the third axis J3 extending along the horizontal plane. The drive motor 2 includes a rotor 2a and a stator 2c. In the present preferred embodiment, the drive motor 2 is an inner-rotor motor. Therefore, the stator 2c surrounds the radially outer side of the rotor 2a.

The rotor 2a rotates around the third axis J3 extending in the horizontal direction. The rotor 2a includes a motor shaft 2b extending along the axial direction about the third axis J3.

The motor shaft 2b rotates around the third axis J3. The motor shaft 2b extends across the motor accommodation unit 61 and the gear accommodation unit 62 of the housing 6. The left end portion of the motor shaft 2b protrudes the inside of the gear accommodation unit 62. A first gear 41 of the gear unit 3 is fixed to the left end portion of the motor shaft 2b.

The gear unit 3 is accommodated in the gear accommodation unit 62 of the housing 6. The gear unit 3 is connected to the drive motor 2. More specifically, the gear unit 3 is connected to the motor shaft 2b in one axial direction. The gear unit 3 transmits power of the drive motor 2. The gear unit 3 has the reduction gear 4 and the differential gear 5.

The reduction gear 4 is connected to the drive motor 2. The reduction gear 4 is disposed to increase the torque output from the drive motor 2 in accordance with a reduction ratio while reducing the rotation speed of the drive motor 2. The reduction gear 4 is disposed to transfer the torque output from the drive motor 2 to the differential gear 5. The reduction gear 4 has a first gear 41, a second gear 42, a third gear 43, and an intermediate shaft 45. That is, the gear unit 3 has the first gear 41, the second gear 42, the third gear 43, and the intermediate shaft 45.

The first gear 41 is fixed to the left end portion of the motor shaft 2b. The first gear 41 rotates around the third axis J3 together with the motor shaft 2b. The intermediate shaft 45 extends along a fifth axis J5 parallel to the third axis J3. The intermediate shaft 45 rotates around the fifth axis J5. The second gear 42 and the third gear 43 are fixed to an outer peripheral face of the intermediate shaft 45 at intervals in the axial direction. The second gear 42 and the third gear 43 are connected to each other with the intermediate shaft 45 interposed therebetween. The second gear 42 meshes with the first gear 41. The second gear 42 rotates around the fifth axis J5. The third gear 43 rotates around the fifth axis J5 together with the second gear 42. The third gear 43 meshes with a ring gear (fourth gear) 51 of the differential gear 5.

The torque output from the drive motor 2 is transmitted to the ring gear 51 of the differential gear 5 through the motor shaft 2b, the first gear 41, the second gear 42, the intermediate shaft 45, and the third gear 43 in this order. A gear ratio between respective gears, the number of gears, and the like of the reduction gear 4 can be changed as appropriate in accordance with a required reduction ratio. In the present preferred embodiment, the reduction gear 4 is a reduction gear of a parallel-axis gearing type, in which center axes of gears are disposed in parallel with each other.

The differential gear 5 is connected to the drive motor 2 with the reduction gear 4 interposed therebetween. The differential gear 5 is a device disposed to transfer the torque output from the drive motor 2 to wheels of the vehicle. The differential gear 5 is disposed to transfer the same torque to axles 55 of left and right wheels while absorbing a difference in speed between the left and right wheels when the vehicle is turning. The differential gear 5 includes the ring gear 51, a gear housing (not illustrated), a pair of pinion gears (not illustrated), a pinion shaft (not illustrated), and a pair of side gears (not illustrated). That is, the gear unit 3 has the ring gear 51. The ring gear 51 meshes with the third gear 43 and rotates around a sixth axis J6 parallel to the third axis J3.

Note that the axle 55 extends along a direction (that is, in the width direction of the vehicle) orthogonal to a traveling direction of the vehicle. Therefore, the traveling direction of the vehicle in a state where the drive device 1 is mounted is estimated based on the extending direction of the axle 55.

The parking mechanism 8 is provided on the gear unit 3 and restricts driving of the gear unit 3. The parking mechanism 8 is driven by an actuator 70. The parking mechanism 8 is switched between a locked state in which the rotation of the motor shaft 2b is blocked and an unlocked state in which the rotation of the motor shaft 2b is allowed by the actuator 70 as a power source. The parking mechanism 8 is in the locked state in a case where the gear of the vehicle is parking, and is in the unlocked state in a case where the gear of the vehicle is other than parking. A case where the gear of the vehicle is other than parking includes, for example, a case where the gear of the vehicle is drive, neutral, reverse, or the like.

Figure 2:
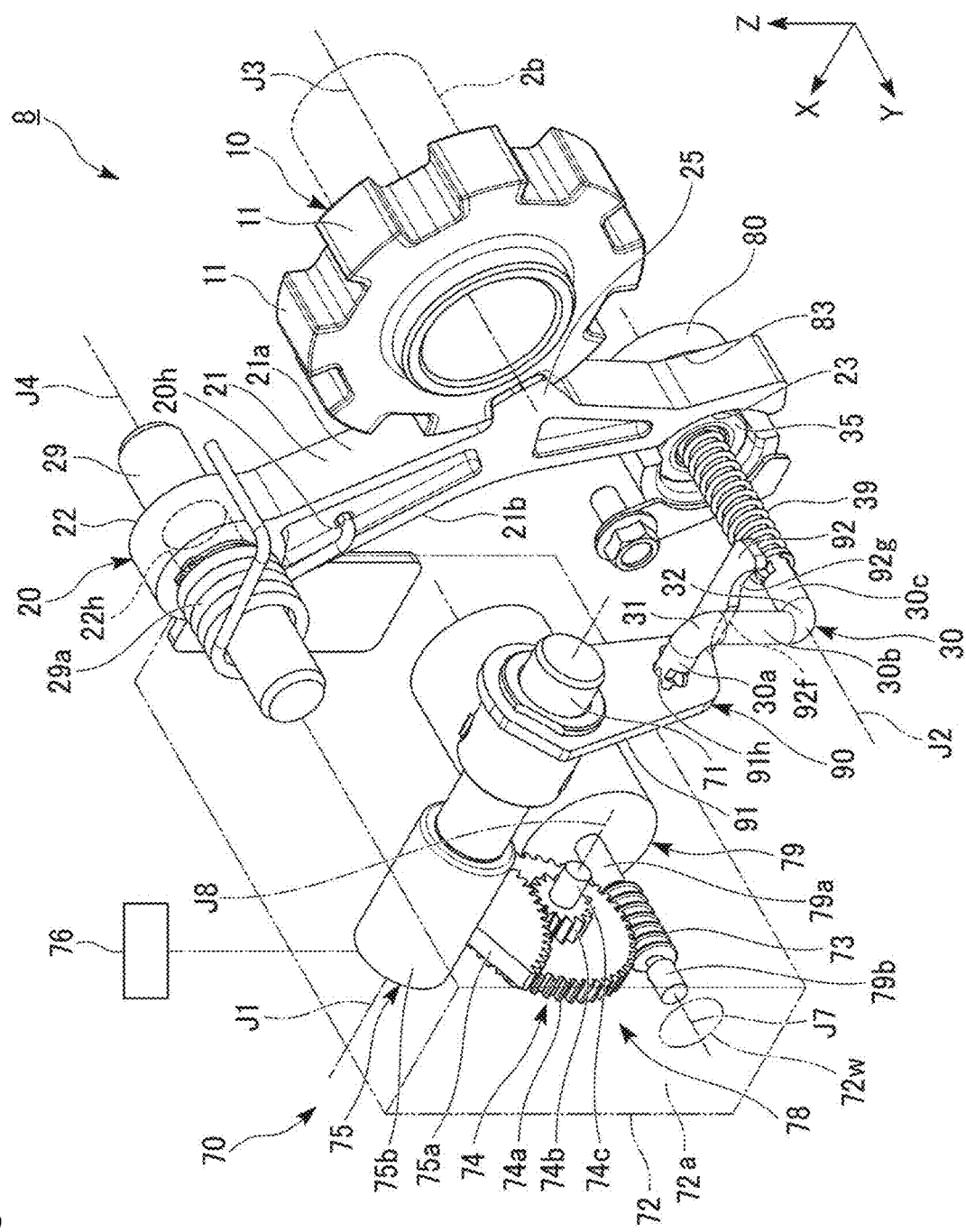
FIG. 2 is a perspective view of a parking mechanism of an embodiment.

FIG. 2 is a perspective view of the parking mechanism 8.

The parking mechanism 8 includes a parking gear 10, a pawl shaft 29, a parking pawl (pawl member) 20, a cam rod 30, a cam 35, a coil spring 39, a sleeve 80, a flange 90, and the actuator 70.

The parking gear 10 is fixed to an outer peripheral face of the motor shaft 2b. The parking gear 10 is disposed between the first gear 41 and the partition 61c in the axial direction.

The parking gear 10 of the present embodiment has an annular shape centered on the third axis J3, and is fitted to the outer peripheral face of the motor shaft 2b. The parking gear 10 rotates together with the motor shaft 2b. That is, the parking gear 10 rotates around the third axis J3 together with the first gear 41 in conjunction with the wheel of the vehicle. A plurality of tooth portions 11 disposed in a circumferential direction is provided on an outer periphery of the parking gear 10. The tooth portion 11 protrudes radially outward of the third axis J3. In a locked state to be described later, the tooth portion 11 meshes with a meshing portion 25.

The pawl shaft 29 extends along a fourth axis J4 parallel to the third axis J3. That is, the pawl shaft 29 is a shaft parallel to the motor shaft 2b. The pawl shaft 29 rotatably supports the parking pawl 20.

A winding spring 29a is mounted on the pawl shaft 29. The winding spring 29a has a spring main body having a coil shape and spring end portions extending from both end portions of the spring main body. The pawl shaft 29 is inserted into the spring main body of the winding spring 29a. The one spring end portion of the winding spring 29a is hooked on a spring hooking portion (not illustrated) provided on an inner face of the housing 6. The other spring end portion of the winding spring 29a is hooked on a spring hooking hole 20h provided on the parking pawl 20. The winding spring 29a applies an elastic force to the parking pawl 20 in a direction in which a distal end is retracted toward the sleeve 80.

The parking pawl 20 is disposed on a side portion of the parking gear 10. The parking pawl 20 includes a proximal end portion 22, a parking pawl main body 21 extending obliquely downward from the proximal end portion 22, a cam contact portion 23, and the meshing portion 25.

The parking pawl main body 21 is disposed between the parking gear 10 and the sleeve 80 when viewed in the axial direction of the third axis J3. The parking pawl main body 21 has a gear facing surface 21a facing the parking gear 10 and a sleeve facing surface 21b facing the sleeve 80. In the present embodiment, the meshing portion 25 is located on the gear facing surface 21a, and the cam contact portion 23 is located on the sleeve facing surface 21b. The cam contact portion 23 is located at a distal end portion of the parking pawl 20. The meshing portion 25 is located between the proximal end portion 22 and the cam contact portion 23 in a length direction of the parking pawl 20.

The proximal end portion 22 of the parking pawl 20 has a support hole 22h centered on the fourth axis J4. The pawl shaft 29 is inserted into the support hole 22h. As a result, the parking pawl 20 is supported by the pawl shaft 29 at the proximal end portion 22, and is rotatable around the fourth axis J4 of the pawl shaft 29.

The meshing portion 25 protrudes from the gear facing surface 21a of the parking pawl main body 21 toward the parking gear 10. The meshing portion 25 faces the tooth portion 11 of the parking gear 10. When the parking pawl 20 rotates around the pawl shaft 29, the meshing portion 25 moves in directions of approaching and being separated from the parking gear 10.

The parking pawl 20 can take any one of a locked state, an unlocked state, and a standby state. The locked state and the unlocked state are mutually shifted in accordance with an operation of the operator. The standby state occurs in the process of shifting from the unlocked state to the locked state when the operator performs an operation to shift from the unlocked state to the locked state.

The locked state is a state in which the meshing portion 25 meshes with the parking gear 10 to inhibit the rotation of the parking gear 10. In the parking mechanism 8 in the locked state, the meshing portion 25 is fitted between the tooth portions 11 of the parking gear 10.

The unlocked state is a state in which the meshing portion 25 is separated from the parking gear 10 to release the lock and allow the rotation of the parking gear 10. In the parking mechanism 8 in the unlocked state, the meshing portion 25 is retracted radially outward of the third axis J3 from between the tooth portions 11.

Figure 6:
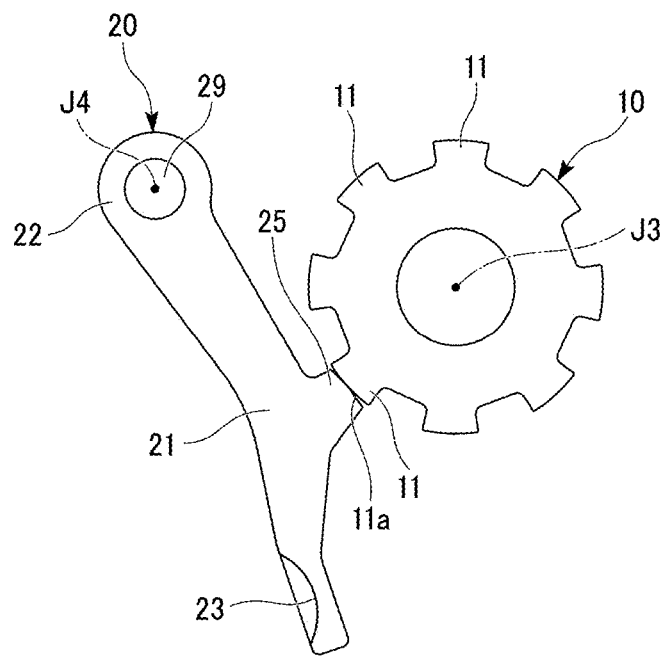
FIG. 6 is a front view of a parking pawl and a parking gear of an embodiment, illustrating a standby state.

As illustrated in FIG. 6, the standby state is a state in which the meshing portion 25 is pressed against the tooth portion 11 of the parking gear 10 to wait for the locked state. In the standby state, when the parking gear 10 rotates and the gap between the tooth portions 11 matches the meshing portion 25, the meshing portion 25 meshes with the tooth portion 11 to transition to the locked state.

The cam contact portion 23 is disposed on the sleeve facing surface 21b of the parking pawl main body 21. The cam contact portion 23 is located on the inner side of a notch portion 83 of the sleeve 80. The cam contact portion 23 functions as an acting portion that receives a force from the cam 35. The parking pawl 20 receives a force from the cam 35 at the cam contact portion 23 and rotates around the fourth axis J4. That is, the parking pawl 20 operates with the movement of the cam 35.

Figure 3:
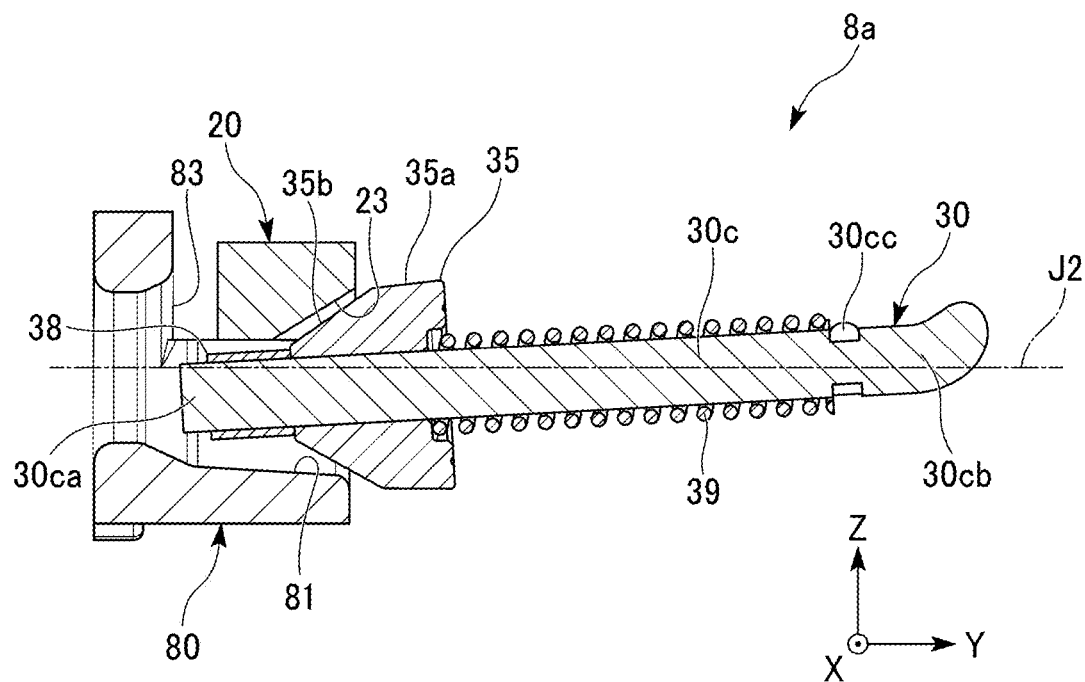
FIG. 3 is a cross-sectional view along a length direction of a cam rod of a drive unit of an embodiment, illustrating an unlocked state.
Figure 4:
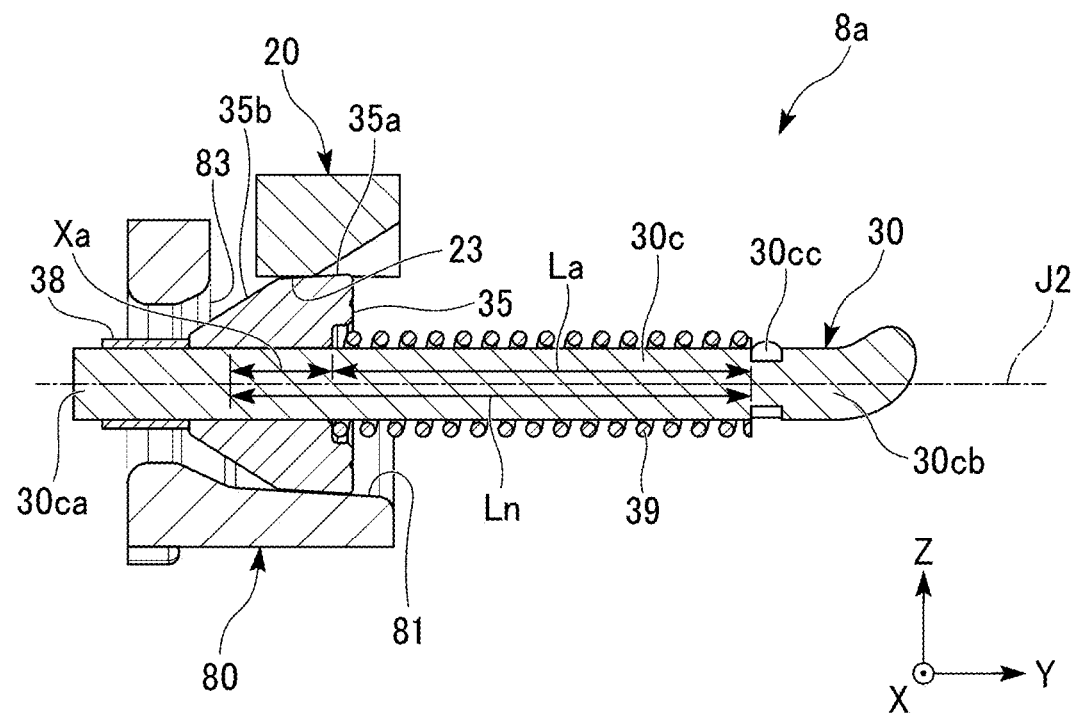
FIG. 4 is a cross-sectional view along the length direction of the cam rod of the drive unit of an embodiment, illustrating a locked state.
Figure 5:
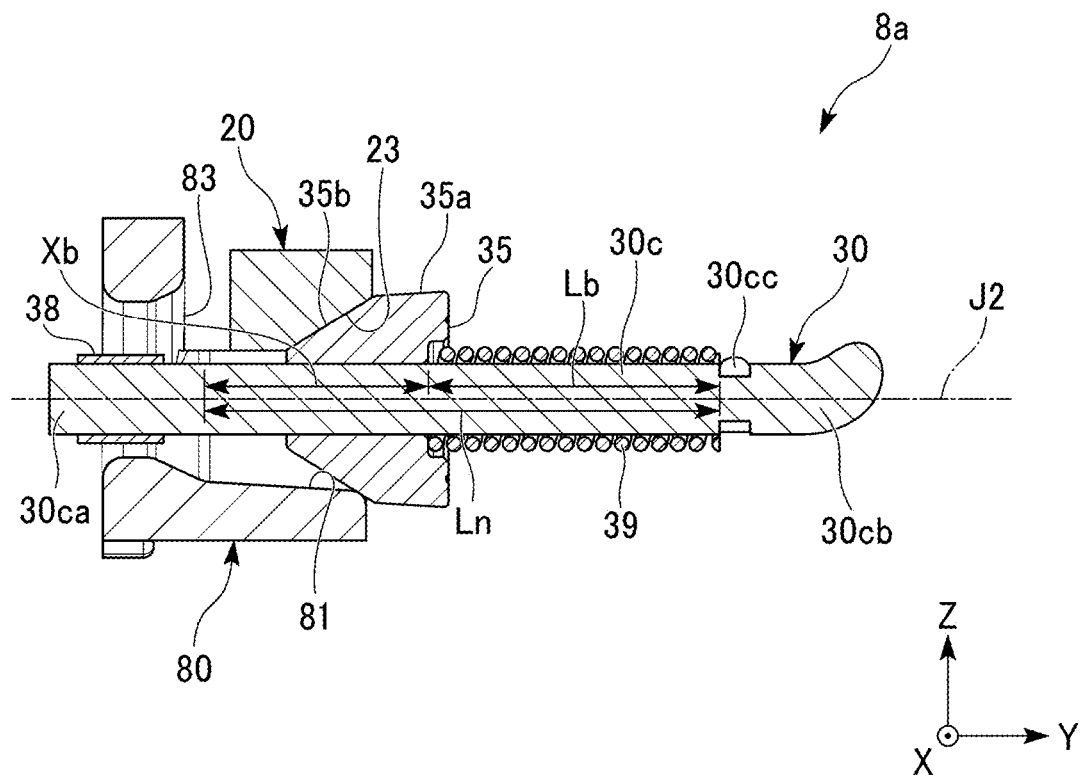
FIG. 5 is a cross-sectional view taken along a length direction of a cam rod of the drive unit of an embodiment, illustrating a standby state.

FIGS. 3 to 5 are cross-sectional views of the cam rod 30 along the length direction, in which FIG. 3 illustrates an unlocked state, FIG. 4 illustrates a locked state, and FIG. 5 illustrates a standby state. FIG. 6 is a front view of the parking pawl 20 and the parking gear 10 of the present embodiment, and illustrates a standby state.

The cam contact portion 23 of the parking pawl 20 faces the outer peripheral face of the cam 35. The cam contact portion 23 is away from the outer peripheral face of the cam 35 in the unlocked state illustrated in FIG. 3. In addition, the cam contact portion 23 comes into contact with the outer peripheral face of the cam 35 in the locked state illustrated in FIG. 4 and the standby state illustrated in FIG. 5. The cam contact portion 23 moves in accordance with motion of the cam 35 with the transition from the unlocked state to the locked state. The parking pawl 20 rotates around the fourth axis J4 with the movement of the cam contact portion 23.

As illustrated in FIG. 2, the actuator 70 extending along a first axis J1 includes a motor 79, a worm gear 73, a counter gear unit 74, an output gear unit 75, a manual shaft 71, a case 72, and a rotation sensor 76. In the present embodiment, the power of the motor 79 is transmitted to the worm gear 73, the counter gear unit 74, the output gear unit 75, and the manual shaft 71 in this order.

The motor 79 has a rotation shaft 79a extending along a seventh axis (axis) J7 orthogonal to the first axis J1. The rotation shaft 79a rotates around the seventh axis J7. The motor 79 is feedback-controlled by a control unit (not illustrated) based on a measurement value by the rotation sensor 76.

The worm gear 73 is provided on the outer peripheral face of the rotation shaft 79a. The worm gear 73 is provided integrally with the rotation shaft 79a. However, the worm gear 73 may be a separate member fixed to the outer peripheral face of the rotation shaft 79a.

The counter gear unit 74 includes a worm wheel 74a, a small diameter gear 74b, and a shaft portion 74c. The counter gear unit 74 is a gear member centered on an eighth axis (axis) J8 parallel to the first axis J1. The eighth axis J8 is orthogonal to the seventh axis J7. The worm wheel 74a, the small diameter gear 74b, and the shaft portion 74c may be each portion of one single member or may be separate members fixed to each other.

The shaft portion 74c of the counter gear unit 74 extends along the eighth axis J8. The worm wheel 74a is a helical gear centered on the eighth axis J8. The worm wheel 74a meshes with the worm gear 73 and rotates around the eighth axis J8. The small diameter gear 74b is a gear having a smaller diameter than the worm wheel 74a. The small diameter gear 74b is a spur gear centered on the eighth axis J8. The small diameter gear 74b rotates around the eighth axis J8 together with the worm wheel 74a.

The output gear unit 75 is fixed to the outer peripheral face of the manual shaft 71, meshes with the small diameter gear 74b, and rotates around the first axis J1. The output gear unit 75 includes a fan gear 75a and a fixed cylindrical portion 75b. The fan gear 75a is a fan-shaped spur gear centered on the first axis J1. The output gear unit 75 meshes with the small diameter gear 74b in the fan gear 75a. The fixed cylindrical portion 75b has a tubular shape centered on the first axis J1. The manual shaft 71 is inserted into the fixed cylindrical portion 75b which is fixed to the manual shaft 71.

The case 72 accommodates the motor 79, the worm gear 73, the counter gear unit 74, and the output gear unit 75. The case 72 accommodates a proximal end portion of the manual shaft 71. The manual shaft 71 extends through the inside and outside of the case 72. The case 72 is disposed outside the housing 6 (see FIG. 1).

The case 72 has a facing wall portion 72a facing a distal end 79b of the rotation shaft 79a. The facing wall portion 72a has an opening 72w. That is, the case 72 has the opening 72w. The opening 72w penetrates the facing wall portion 72a in the thickness direction. The opening 72w exposes the distal end 79b of rotation shaft 79a to the outside of the case 72. A lid (not illustrated) that covers the opening 72w is attached to the case 72.

According to the present embodiment, by opening the opening 72w of the case 72, the operator can access the distal end 79b of the rotation shaft 79a without disassembling the case 72. As a result, the distal end 79b of the rotation shaft 79a is rotated, and the manual shaft 71 can be driven via each gear. The structure of the distal end 79b for rotating the rotation shaft 79a will be described later with reference to FIGS. 9 and 10.

The manual shaft 71 has a columnar shape centered on the first axis J1. The manual shaft 71 rotates around the first axis J1 together with the output gear unit 75. That is, the manual shaft 71 rotates around the first axis J1 by the power of the motor 79.

The manual shaft 71 extends into and out of the housing 6 (see FIG. 1). The manual shaft 71 is connected to the flange 90 inside the housing 6, inserted into the case 72 outside the housing 6, and connected to the output gear unit 75.

As illustrated in FIG. 2, the manual shaft 71 and the pawl shaft 29 of the present embodiment extend orthogonal to each other. That is, the pawl shaft 29 extends along the fourth axis J4 orthogonal to the first axis J1.

According to the present embodiment, as compared with the case where the manual shaft 71 and the pawl shaft 29 extend in parallel to each other, the shafts can be three-dimensionally disposed, and the parking mechanism 8 can be downsized as a whole.

The pawl shaft 29 is disposed around the parking gear 10 in parallel with the rotation axis of the parking gear 10. Therefore, the parking pawl 20 extends in the left-right direction of the vehicle, and the manual shaft 71 extends in the front-rear direction of the vehicle.

According to the present embodiment, since the manual shaft 71 and the pawl shaft 29 extend orthogonal to each other, the direction in which the manual shaft 71 extends can be set to the front-rear direction of the vehicle. As a result, the driving direction of the flange 90 and the cam rod 30 driven by the manual shaft 71 is the left-right direction of the vehicle. According to the present embodiment, it is possible to suppress influence of the inertial force accompanying the sudden acceleration and the sudden stop of the vehicle on motion of the flange 90 and the cam rod 30.

In the present embodiment, the manual shaft 71 is disposed below the pawl shaft 29. Therefore, the region below the pawl shaft 29 can be effectively used as a region through which the manual shaft 71 passes, and the parking mechanism 8 can be downsized.

The rotation sensor 76 is attached to the output gear unit 75. The rotation sensor 76 measures the rotation angles of the output gear unit 75 and the manual shaft 71. The rotation sensor 76 is connected to a control unit (not illustrated) that controls the motor 79.

In the present embodiment, the worm gear 73 and the worm wheel 74a are disposed in the power transmission path of the actuator 70. As a result, the self-holding torque of the actuator 70 is increased. Here, the self-holding torque is the maximum torque that can suppress the rotation of the internal mechanism with respect to the torque input from the output side. In the actuator 70 of the present embodiment, the self-holding torque is a torque around the first axis J1 input to the manual shaft 71, and is a torque at which the manual shaft 71 starts to rotate.

In the power transmission path including the worm gear 73 and the worm wheel 74a, a loss associated with power transmission from the output side to the input side is larger than a loss associated with power transmission from the input side to the output side. Therefore, the actuator 70 can increase the self-holding torque by including the worm gear 73 and the worm wheel 74a. That is, according to the present embodiment, the self-holding torque of the actuator 70 can be increased with a simple structure. As will be described in detail later, the actuator 70 has a sufficiently large self-holding torque, so that the rotation angle of the manual shaft 71 can be maintained even when a large force is applied from the cam rod 30.

In the present embodiment, the actuator 70 including the worm gear 73 and the worm wheel 74a will be described, but the actuator 70 is not limited to the present embodiment. Even when the actuator 70 does not include the worm gear 73 and the worm wheel 74a, a similar effect can be obtained as long as the actuator 70 has sufficient self-holding torque. Specifically, when the reduction ratio of the power transmission path from the rotation shaft 79a to the manual shaft 71 is 1:100 or more, the sufficient self-holding torque can be obtained. The reduction ratio also satisfies the actuator 70 of the present embodiment.

The flange 90 is provided on the outer peripheral face of the manual shaft 71. The flange 90 of the present embodiment is a separate member from the manual shaft 71 and is fixed to the outer peripheral face of the manual shaft 71. However, the flange 90 may be part of the manual shaft 71.

The flange 90 extends along the radial direction of the first axis J1. The flange 90 rotates around the first axis J1 together with the manual shaft 71. The flange 90 of the present embodiment includes a flange body 91 extending along the radial direction of the first axis J1 and a protruding portion 92 provided at the distal end of the flange body 91. The protruding portion 92 protrudes from the flange body 91 along the axial direction of the first axis J1.

The flange body 91 has a plate shape orthogonal to the first axis J1. The flange body 91 has a coupling hole 91h penetrating the body in the thickness direction. A coupling portion 30a of the cam rod 30 passes through the coupling hole 91h. The coupling portion 30a of the cam rod 30 is rotatable about the coupling hole 91h.

The cam rod 30 has the coupling portion 30a, a relay portion 30b, and a rod body 30c. In the cam rod 30, a first bent portion 31 is provided between the coupling portion 30a and the relay portion 30b, and a second bent portion 32 is provided between the relay portion 30b and the rod body 30c. The cam rod 30 is bent at approximately 90° in each of the first bent portion 31 and the second bent portion 32. The cam rod 30 has a rod shape with a circular cross section bent in the first bent portion 31 and the second bent portion 32.

The coupling portion 30a extends axially along the axial direction of the first axis J1. Therefore, the coupling portion 30a extends in parallel with the manual shaft 71. The coupling portion 30a is inserted into the coupling hole 91h of the flange 90. Thus, the coupling portion 30a is coupled to the flange 90 so as to be rotatable with respect to the flange 90. That is, the cam rod 30 is rotatably supported by the flange 90 at the coupling portion 30a. On the outer periphery of the coupling portion 30a, a projection that suppresses detachment of the coupling portion 30a from the coupling hole 91h is provided.

The rod body 30c extends axially along a second axis J2 substantially parallel to the third axis J3. The second axis J2 is orthogonal to the first axis J1. Therefore, the rod body 30*c* extends in a direction orthogonal to the coupling portion 30*a*. The rod body 30*c* passes through the inside of the sleeve 80. The rod body 30*c* is guided by the sleeve 80. That is, the cam rod 30 is supported by the sleeve 80 in the rod body 30*c*. In addition, the cam rod 30 moves along the second axis J2 with the movement of the flange 90 (that is, the rotation around the first axis J1). In the unlocked state, the rod body 30*c* is slightly inclined with respect to the second axis J2 (see FIG. 3).

The relay portion 30*b* extends axially along a direction (vertical direction in the present embodiment) orthogonal to the first axis J1 and the second axis J2. Therefore, the relay portion 30*b* is orthogonal to the coupling portion 30*a* and the rod body 30*c*. The upper end of the relay portion 30*b* is connected to the coupling portion 30*a*. Further, the lower end of the relay portion 30*b* is connected to the rod body 30*c*. The relay portion 30*b* connects the coupling portion 30*a* and the rod body 30*c*.

The relay portion 30*b* extends toward the third axis J3 when viewed in the axial direction of the third axis J3. The relay portion 30*b* is provided to shift relative positions in the vertical direction between the coupling portion 30*a* and the rod body 30*c*. By disposing the relay portion 30*b* so as to extend toward the third axis J3 side, the coupling portion 30*a* can be disposed closer to the third axis J3 than the rod body 30*c*. Therefore, while the cam 35 supported by the rod body 30*c* is disposed at the optimum position, the flange 90, the manual shaft 71, the actuator, and the like connected to the coupling portion 30*a* can be disposed close to the third axis J3. As a result, each part of the parking mechanism 8 can be densely disposed around the third axis J3, and the arrangement space of the parking mechanism 8 in the drive device 1 can be reduced.

As illustrated in FIGS. 3 to 5, the rod body 30*c* passes through the coil spring 39, the cam 35, and a cap 38. That is, the coil spring 39, the cam 35, and the cap 38 are attached to the rod body 30*c*.

In the following description, an end portion, of the rod body 30*c*, connected to the relay portion 30*b* is referred to as a proximal end 30*cb*, and an end portion opposite to the proximal end is referred to as a distal end 30*ca*.

The coil spring 39 is disposed closer to the proximal end 30*cb* of the rod body 30*c* than the cam 35. A projection 30*cc* larger than the inner diameter of the coil spring 39 is provided on the outer periphery of the proximal end 30*cb* of the rod body 30*c*. The coil spring 39 is disposed between the projection 30*cc* and the cam 35 in a state of being compressed with respect to the natural length. The coil spring 39 applies a force toward the distal end 30*ca* of the rod body 30*c* to the cam 35.

The cap 38 is fixed to the distal end 30*ca* of the rod body 30*c*. The cap 38 is disposed closer to the distal end 30*ca* of the rod body 30*c* than the cam 35. The cap 38 contacts the end face of the cam 35. The cap 38 restricts the movement of the cam 35 toward the distal end 30*ca* with respect to the rod body 30*c*. The cap 38 prevents the cam 35 from falling off the distal end 30*ca* of the rod body 30*c*.

The cam 35 has an annular shape centered on the rod body 30*c*. The rod body 30*c* is inserted into a through hole at the center of the cam 35. The inner diameter of the through hole of the cam 35 is larger than the outer diameter of the rod body 30*c*. The cam 35 is sandwiched between the coil spring 39 and the cap 38 in the length direction of the rod body 30*c*. The coil spring 39 is compressed as the cam 35 moves toward the proximal end 30*cb*. When receiving a force toward the proximal end 39*cb* stronger than the repulsive force of the coil spring 39, the cam 35 compresses the coil spring 39 and moves toward the proximal end 30*cb* with respect to the rod body 30*c*.

The outer peripheral face of the cam 35 is in contact with the cam contact portion 23 of the parking pawl 20. A first conical face 35*a* and a second conical face 35*b* are provided on the outer peripheral face of the cam 35. The first conical face 35*a* and the second conical face 35*b* are coaxially disposed. Each of the first conical face 35*a* and the second conical face 35*b* is a conical tapered face whose outer diameter gradually decreases from the proximal end 30*cb* toward the distal end 30*ca* of the rod body 30*c*. The second conical face 35*b* is located closer to the distal end 30*ca* than the first conical face 35*a*. The taper angle of the first conical face 35*a* is sufficiently smaller than a taper angle of the second conical face 35*b*. The taper angle of the second conical face 35*b* is set to an angle sufficient for the cam 35 to be smoothly detached from between the sleeve 80 and the cam contact portion 23 at the time of transition from the locked state to the unlocked state. Note that the first conical face 35*a* may be a cylindrical surface having a cylindrical shape instead of the conical shape.

The motion of the rod body 30*c* is transmitted to the cam 35 via the coil spring 39. As a result, the cam 35 moves along the second axis together with the rod body 30*c*. Further, the outer peripheral face of the cam 35 is in contact with the cam contact portion 23 of the parking pawl 20. The cam 35 moves with motion of the cam rod 30 to operate the parking pawl 20.

As illustrated in FIG. 3, in the parking mechanism 8 in the unlocked state, the second conical face 35*b* of the cam 35 faces the cam contact portion 23 of the parking pawl 20 with a gap interposed therebetween. Further, as illustrated in FIG. 4, in the parking mechanism 8 in the locked state, the cam 35 contacts the cam contact portion 23 on the first conical face 35*a*. When the state of the parking mechanism 8 is switched between the locked state and the unlocked state, the second conical face 35*b* of the cam 35 comes into contact with the cam contact portion 23 and further slides. In this manner, the cam 35 moves the cam contact portion 23 upward and rotates the parking pawl 20 around the fourth axis J4.

As illustrated in FIG. 5, in the parking mechanism in the standby state, the cam 35 comes into contact with the cam contact portion 23 on the second conical face 35*b*. As illustrated in FIG. 6, the standby state is a state in which the meshing portion 25 is pressed against the outer peripheral face of the tooth portion 11 of the parking gear 10. As illustrated in FIG. 5, in, even when the cam rod 30 moves to the position in the locked state, the cam 35 cannot move, and the parking pawl 20 is in a state in which the cam 35 is pressed against the cam contact portion 23. As a result, the coil spring 39 is compressed between the cam 35 and the projection 30*cc* of the rod body 30*c*. The coil spring 39 presses the cam 35 against the cam contact portion 23 until the parking gear 10 rotates and the meshing portion 25 meshes between the tooth portions 11. The coil spring 39 is most compressed in the standby state.

FIGS. 4 and 5 illustrate a natural length Ln of the coil spring 39. As described above, the coil spring 39 is assembled to the rod body 30*c* in a compressed state. As illustrated in FIG. 4, the coil spring 39 in the initial assembling state is compressed by Xa to have a length La. As illustrated in FIG. 5, the coil spring 39 in the standby state is compressed by the maximum compression amount Xb to have a length Lb. That is, the coil spring 39 is compressed by the maximum compression amount Xb in a state where the meshing portion 25 is pressed against the outer peripheral face 11a of the tooth portion 11 (standby state).

The sleeve 80 has a tubular shape extending along the second axis J2. The distal end 30ca of the rod body 30c is inserted into the sleeve 80. The sleeve 80 has a tubular shape surrounding the rod body 30c. The sleeve 80 has the notch portion 83 that opens part of an inner face 81 radially outward. The sleeve 80 is fixed to an inner face of the housing 6. The sleeve 80 guides motion of the rod body 30c and the cam 35.

Figure 7:
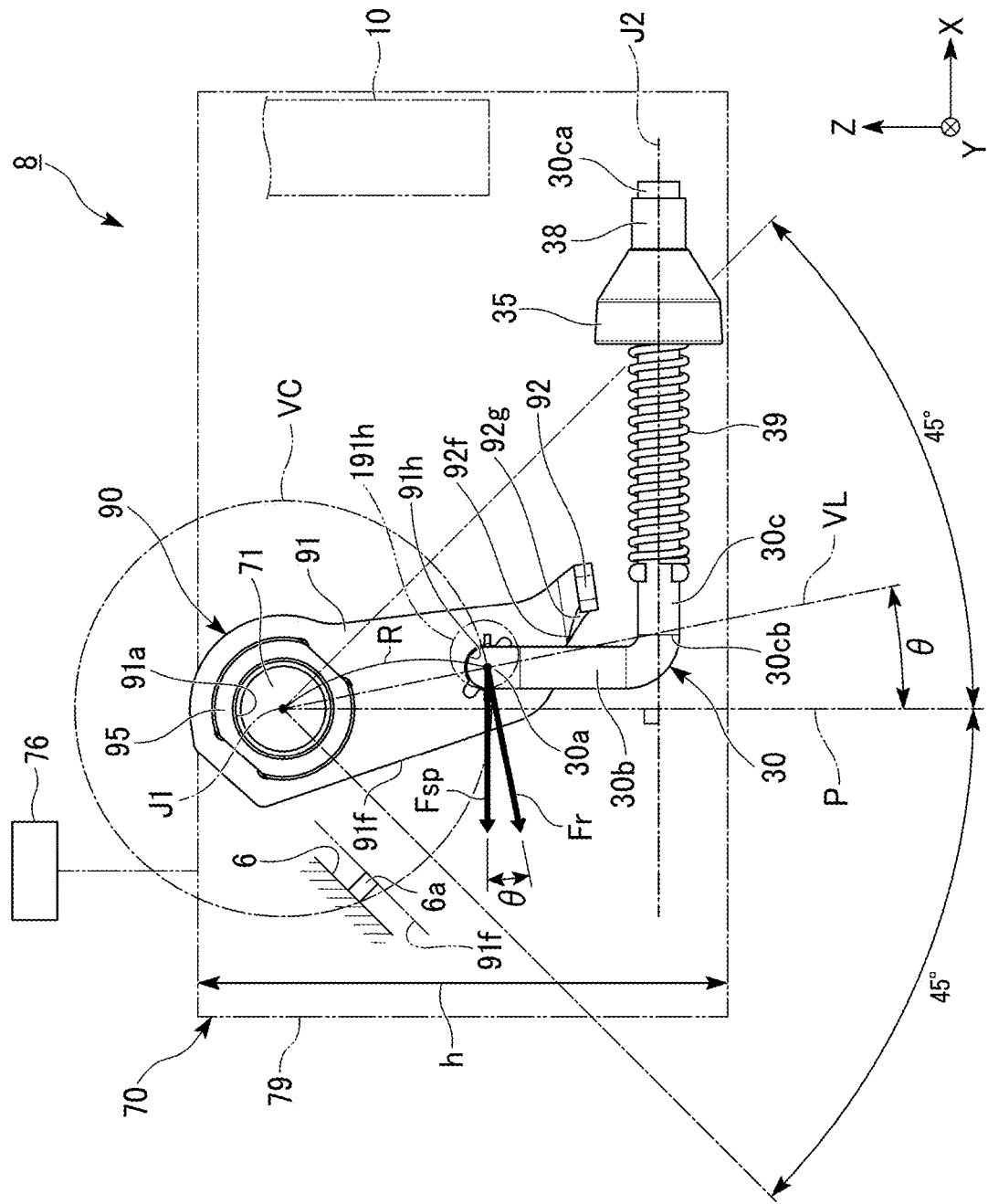
FIG. 7 is a side view of part of the parking mechanism of an embodiment when viewed in the axial direction of the first axis.

FIG. 7 is a side view of part of the parking mechanism 8 of the present embodiment when viewed in the axial direction of the first axis J1.

As illustrated in FIG. 7, an imaginary perpendicular line P is set from the first axis J1 to the second axis J2 when viewed in the axial direction of the first axis J1. The perpendicular line P is orthogonal to the second axis J2. In the present embodiment, since the first axis J1 and the second axis J2 extend along the horizontal direction, the perpendicular line P extends in the vertical direction. Note that the perpendicular line P does not necessarily extend in the vertical direction.

When viewed in the axial direction of the first axis J1, an imaginary line VL connecting the first axis J1 and the center point of the coupling portion 30a of the cam rod 30 is set. The coupling portion 30a moves around the first axis J1 as the manual shaft 71 rotates. Therefore, the coupling portion 30a moves along an imaginary circle VC centered on the first axis J1 with motion of the flange 90.

An angle formed by the imaginary line VL and the perpendicular line P is defined as $\theta$. That is, an angle formed by the perpendicular line P and the coupling portion 30a when viewed in the axial direction of the first axis J1 is defined as $\theta$. The angle $\theta$ changes with the movement of the coupling portion 30a along the imaginary circle VC. The coupling portion 30a moves around the first axis J1 within a range of $\pm 45°$ with respect to the perpendicular line P. Therefore, the angle $\theta$ is an angle of $\pm 45°$ or less. Here, the range ($\pm 45°$) in which the coupling portion 30a moves is only the maximum range, and the coupling portion 30a moves within a narrower movable range within this range.

When viewed in the axial direction of the first axis J1, a distance between the first axis J1 and the coupling portion 30a is defined as R. The distance R is a radius of the imaginary circle VC. Further, a spring constant of the coil spring 39 is set to k. The maximum compression amount of the coil spring 39 in the movable range of the rod body 30c is defined as Xb. Furthermore, the self-holding torque of the actuator 70 is defined as Ts.

As described above, Formula 1 holds, where k is a spring constant, Xb is a maximum compression amount, the distance R, $\theta$ is an angle, Ts is a self-holding torque of the actuator 70 of the present embodiment.

$$Ts > k \cdot Xb \cdot R \cdot \cos \theta \quad \text{(Formula 1)}$$

The right side of Formula 1 is the maximum torque that can be input from the cam rod 30 to the manual shaft 71. The manual shaft 71 receives torque from the cam rod 30 when the coil spring 39 is compressed. Therefore, when the parking pawl 20 is in a standby state and the coil spring 39 is compressed by the maximum compression amount Xb, the largest torque is applied to the manual shaft 71.

A reaction force Fsp of the coil spring 39 is applied to the coupling portion 30a. The reaction force Fsp is expressed as a product of the maximum compression amount Xb of the coil spring 39 and the spring constant k of the coil spring 39. The reaction force Fsp has a direction forming an angle $\theta$ with respect to the tangential direction of the imaginary circle VC. Therefore, the maximum torque applied to the manual shaft 71 is a value (the right side of Formula 1) obtained by multiplying Fsp by $\cos \theta$.

According to the present embodiment, the actuator 70 has a self-holding torque Ts larger than the maximum torque that can be input from the cam rod 30 to the manual shaft 71. Therefore, the actuator 70 can maintain the rotation angle of the manual shaft 71 without rotating the manual shaft 71 even when receiving the torque from the cam rod 30.

According to the parking mechanism 8 of the present embodiment, a positioning structure such as a leaf spring for positioning the rotation angle of the manual shaft 71 is not required. Therefore, according to the present embodiment, not only the number of parts can be reduced, but also the parking mechanism 8 can be downsized.

In addition, according to the parking mechanism 8 of the present embodiment, it is not necessary to rotate the manual shaft 71 against the elastic force of the leaf spring as compared with the case where a positioning structure such as a leaf spring is provided, and it is possible to achieve power saving of the actuator 70.

According to the actuator 70 of the present embodiment, the reduction ratio of the power transmission path from the rotation shaft 79a to the manual shaft 71 is 1:100 or more. As a result, the self-holding torque Ts is secured. In addition, by realizing such a large reduction ratio, the actuator 70 can apply a large force to the cam rod 30.

When the parking pawl 20 shifts from the locked state to the unlocked state, the cam 35 may be caught by a force received from the cam contact portion 23 of the parking pawl 20. According to the present embodiment, since the actuator 70 can apply a large force to the cam rod 30, it is easy to eliminate frictional engagement of the cam 35. In addition, the force generated in the cam 35 when the cam 35 is caught tends to increase when the parking gear 10 is fixed to a shaft that transmits high torque. According to the present embodiment, configuration in which it is easy to eliminate frictional engagement of the cam 35 is provided, so that it is easy to adopt a structure in which the parking gear 10 is fixed to a shaft (for example, the intermediate shaft 45 (see FIG. 1)) having a large transmission torque.

In FIG. 7, the outer diameter of the case 72 of the actuator 70 is indicated by a two-dot chain line. As illustrated in FIG. 7, the dimension of the actuator 70 in the direction in which the perpendicular line P extends (the vertical direction in the present embodiment) is defined as a height dimension h. In the present embodiment, the distance R between the first axis J1 and the coupling portion 30a when viewed in the axial direction of the first axis J1 is smaller than the height dimension h of the actuator. Therefore, the flange 90 does not become too large with respect to the size of the actuator 70, and the compact parking mechanism 8 can be provided.

In the present embodiment, the coupling portion 30a of the cam rod 30 moves around the first axis J1 within a range of $\pm 45°$ with respect to the perpendicular line P. That is, the angle $\theta$ is an angle within a range of $\pm 45°$. A movement stroke along the second axis J2 of the cam rod 30 is expressed by $R \cdot \sin \theta$. By setting the range of the angle $\theta$ to $\pm 45°$, it is possible to ensure a sufficiently large movement stroke of the cam rod 30 with respect to the rotation angle of the manual shaft 71.

Next, the configuration of the protruding portion 92 of the flange 90 will be described more specifically.

As illustrated in FIG. 2, the protruding portion 92 is disposed closer to the parking gear 10 than the relay portion 30b in the axial direction of the second axis J2 and overlaps with the relay portion 30b when viewed in the axial direction of the second axis J2.

The protruding portion 92 has a facing surface 92f facing the relay portion 30b. The facing surface 92f faces the relay portion 30b via a gap in the axial direction of the second axis J2. The facing surface 92f has a groove 92g extending along a direction (the vertical direction in the present embodiment) in which the relay portion 30b extends. That is, the protruding portion 92 has the groove 92g located at the facing surface 92f. Since the protruding portion 92 of the present embodiment has a plate shape, the groove 92g has a notch shape.

Here, as indicated by a two-dot chain line in FIG. 7, it is assumed that a coupling hole 191h provided in the flange 90 is sufficiently large with respect to the outer periphery of the coupling portion 30a of the cam rod 30. In this case, the cam rod 30 is movable along the second axis J2 with respect to the flange 90 by the backlash between the coupling hole 191h and the coupling portion 30a. The size of the backlash between the coupling hole 191h and the coupling portion 30a along the second axis J2 is larger than the distance between the relay portion 30b and the protruding portion 92 in the direction along the second axis J2. Therefore, how the force is transmitted from the flange 90 to the cam rod 30 changes depending on which direction in the circumferential direction the direction of rotation of the flange 90 is. That is, when the flange 90 rotates counterclockwise in FIG. 7, the cam rod 30 is pushed rightward in FIG. 7 by the inner face of the coupling hole 191h. On the other hand, when the flange 90 rotates clockwise in FIG. 7, the cam rod 30 is pushed leftward in FIG. 7 at the facing surface of the relay portion 30b.

According to this configuration, the cam rod 30 comes into contact with the flange body 91 at the coupling portion 30a and moves toward the parking gear 10 (right side in FIG. 7) along the second axis J2 with the rotational movement of the flange 90 around the first axis J1 in one circumferential direction (counterclockwise in FIG. 7). In addition, the cam rod 30 comes into contact with the protruding portion 92 at the relay portion 30b and moves in a direction (left side in FIG. 7) away from the parking gear 10 along the second axis J2 with the rotational movement of the flange 90 around the first axis J1 in the other circumferential direction (clockwise in FIG. 7).

According to this configuration, the position of the action point at which the force is transmitted from the flange 90 to the cam rod 30 can be changed between when the cam rod 30 is moved toward the parking gear 10 and when the cam rod 30 is moved to the opposite direction. More specifically, the action point can be disposed farther from the first axis J1 when the cam rod 30 is moved in a direction (left side in FIG. 7) away from the parking gear 10 than that when the cam rod is moved toward the parking gear 10. As a result, when the cam rod 30 is moved in a direction (left side in FIG. 7) away from of the parking gear 10, the cam rod 30 can be largely moved at a small rotation angle. On the other hand, when the cam rod 30 is moved toward the parking gear 10 (right side in FIG. 7), the cam rod 30 can be moved with a large force.

The protruding portion 92 is used in a method of assembling the parking mechanism 8.

The method of assembling the parking mechanism 8 includes a flange fixing step, a cam rod coupling step, and a sleeve attaching step. Here, each of these steps will be mainly described.

In the parking mechanism 8 shown in FIG. 2, the following preparations are made in advance before performing the flange fixing step, the cam rod coupling step, and the sleeve attaching step.

In the assembly process of the parking mechanism 8, first, the actuator 70 is assembled. Then, the actuator 70 is fixed to the outer face of the housing 6 (see FIG. 1). The pawl shaft 29 and the parking pawl 20 are assembled to the inner face of the housing 6, and the parking gear 10 is further assembled to the gear unit.

Figure 8:
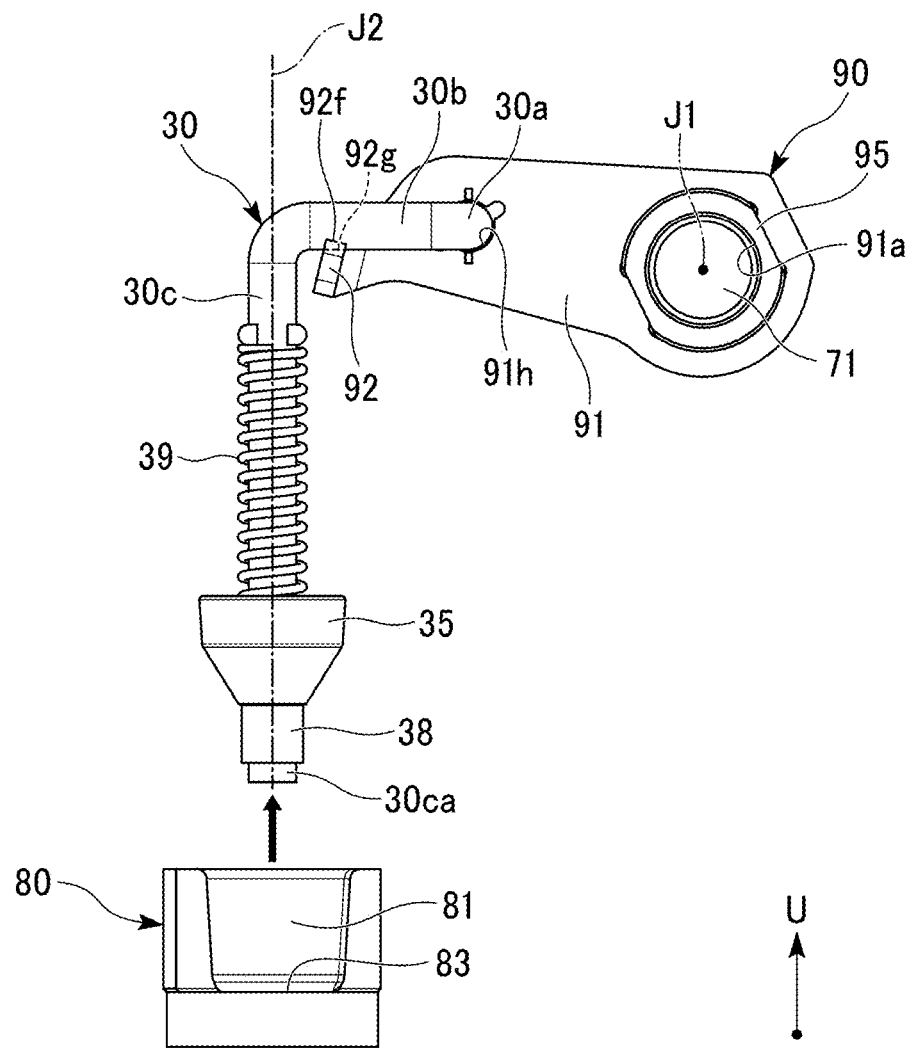
FIG. 8 is a side view for explaining a flange fixing step, a cam rod coupling step, and a sleeve attaching step of the method of assembling the parking mechanism of an embodiment.

FIG. 8 is a side view for explaining the flange fixing step, the cam rod coupling step, and the sleeve attaching step in the method of assembling the parking mechanism 8 of the present embodiment. In FIG. 8, the upper side in the vertical direction in the assembly process is indicated by an arrow U.

The flange fixing step, the cam rod coupling step, and the sleeve attaching step are performed in this order. As described above, the actuator 70 is fixed to the housing 6 prior to the flange fixing step. Therefore, the manual shaft 71 of the actuator 70 protrudes from the inner face of the housing 6 to the inside of the housing 6.

The flange fixing step is a step of fixing the flange 90 to the manual shaft 71. In the flange fixing step, the operator inserts the manual shaft 71 into an insertion hole 91a provided in the flange 90, and relatively fixes the manual shaft 71 by the fixing member 95.

The cam rod coupling step is a step of coupling the cam rod 30 to the flange 90. Prior to the cam rod coupling step, the coil spring 39, the cam 35, and the cap 38 are assembled to the rod body 30c.

In the cam rod coupling step, the operator inserts the coupling portion 30a of the cam rod 30 into the coupling hole 91h provided in the flange 90 and rotatably couples the coupling portion. A projection is provided on an outer peripheral face of the coupling portion 30a of the cam rod, and a notch having substantially the same shape as the projection is provided on an inner edge of the coupling hole 91h. When inserting the coupling portion 30a into the coupling hole 91h, the operator inserts the projection of the coupling portion 30a into the notch of the coupling hole 91h in an alignment manner to rotate the coupling portion 30a. Accordingly, it is possible to suppress detachment of the coupling portion 30a from the flange 90.

The sleeve attaching step is a step of attaching the sleeve 80. As illustrated in FIG. 8, the sleeve attaching step is performed in a posture in which the second axis J2 is disposed along the vertical direction. That is, the sleeve attaching step is performed in a state where the housing 6 is inclined by 90° in the vertical direction from the horizontal direction.

In the sleeve attaching step, the protruding portion 92 of the flange 90 is disposed below the relay portion 30b of the cam rod 30. In the sleeve attaching step, the operator inserts the distal end 30ca of the rod body 30c into the sleeve 80 while supporting the relay portion 30b from below by the protruding portion 92. Further, the operator fixes the sleeve 80 to the inner face of the housing 6.

In the sleeve attaching step, the relay portion 30b is accommodated in the groove 92g of the protruding portion 92. As a result, the protruding portion 92 can not only simply support the relay portion 30b from below but also stabilize the relay portion 30b, and it is possible to suppress detachment of the relay portion 30b in the sleeve attaching step.

According to the present embodiment, since the protruding portion 92 is provided in the flange 90, the cam rod 30 that tends to be unstable in the assembly process can be temporarily held by the protruding portion 92. As a result, the work of inserting the distal end 30ca of the rod body 30c into the sleeve 80 can be easily performed, and the assembly process of the parking mechanism 8 can be simplified.

The flange fixing step and the cam rod coupling step described above are also preferably performed in the same posture as the sleeve attaching step. As a result, it is not necessary to change the posture of the housing 6 during the process, and the takt time between the steps can be reduced.

Next, a configuration of the rotation sensor 76 will be described.

The parking mechanism 8 of the present embodiment does not have a mechanical positioning mechanism for the rotation angle of the manual shaft 71. Therefore, the positioning of the rotation angle of the manual shaft 71 is electrically controlled based on the measurement result by the rotation sensor 76 provided in the output gear unit 75. In the present embodiment, the actuator 70 acquires the reference value of the rotation sensor 76 by performing the abutment step. The rotation sensor 76 outputs the rotation angle of the manual shaft 71 based on the relative angle from the reference value.

As illustrated in FIG. 7, an abutment member 6a is provided on an inner face of the housing 6 that accommodates the parking mechanism 8. The abutment member 6a of the present embodiment is a pin-shaped member fixed to the inner face of the housing 6. The abutment member 6a may be part of the inner face of the housing 6.

The abutment member 6a faces an end face 91f of the flange 90 in the circumferential direction around the first axis J1. That is, the abutment member 6a faces the flange 90 on the rotation track of the flange 90.

The abutment step is a step of abutting the flange 90 against the abutment member 6a. The flange 90 is rotated toward the abutment member 6a with the rotation of the manual shaft 71, and comes into contact with the abutment member 6a at the end face 91f.

When the flange 90 comes into contact with the abutment member 6a, the rotation of the flange 90 is restricted. A control unit (not illustrated) connected to the rotation sensor 76 determines that the flange 90 comes into contact with the abutment member 6a when the measurement value of the rotation sensor 76 is constant, and stores this value as a reference value. The control unit controls the rotation angle of the manual shaft 71 with the reference value as a mechanical reference.

According to the present embodiment, the reference value of the rotation sensor 76 is derived using the abutment member 6a provided on the housing 6. Therefore, regardless of the assembly accuracy of the rotation sensor 76 and the individual difference in the dimensional accuracy of each member, the measurement value of the rotation sensor 76 can be measured with high accuracy with the rotation angle from the abutment member 6a as a reference, and the parking mechanism 8 can be operated stably.

According to the present embodiment, the abutment member 6a is provided on the housing 6. Since each part of the parking mechanism 8 is assembled with the housing 6 as a reference, when the abutment member 6a is provided on the housing 6 and the rotation angle measured by the rotation sensor 76 is set as a reference, relative positional accuracy with respect to other members can be easily enhanced, and measurement accuracy of the rotation sensor 76 can be enhanced.

Next, the manual operation of the actuator 70 will be described.

As illustrated in FIG. 2, in the actuator 70 of the present embodiment, the distal end 79b of rotation shaft 79a is exposed from the opening 72w of the case 72. The operator can rotate the rotation shaft 79a by inserting a tool from the opening 72w.

Figure 9:
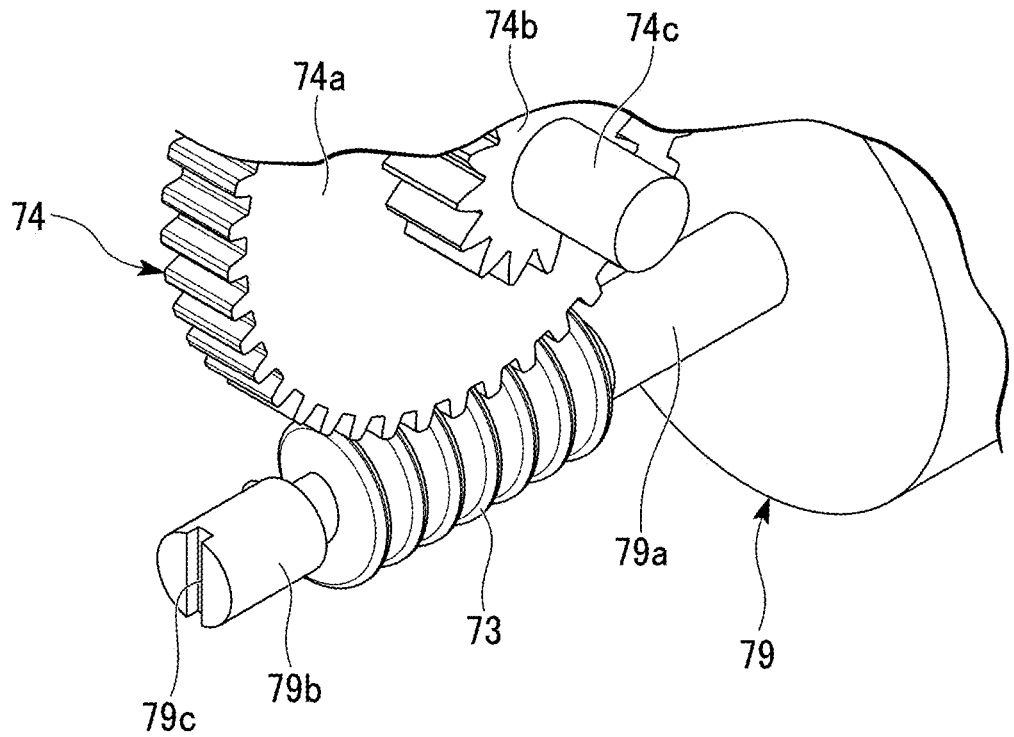
FIG. 9 is a perspective view illustrating an example of a tool connecting portion that can be used in an embodiment.
Figure 10:
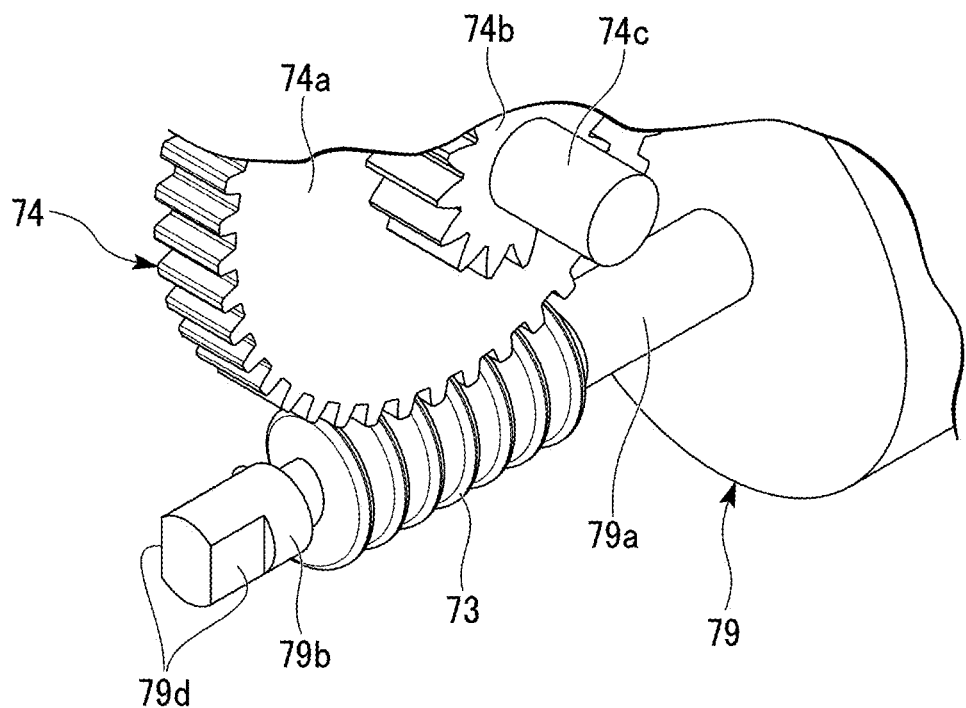
FIG. 10 is a perspective view illustrating an example of a tool connecting portion that can be used in an embodiment.

FIGS. 9 and 10 are perspective views illustrating tool connecting portions 79c and 79d provided at the distal end 79b of the rotation shaft 79a, respectively.

The tool connecting portion 79c illustrated in FIG. 9 is a linear recessed groove provided on the face of the distal end 79b of the rotation shaft 79a. A flathead screwdriver can be connected to the tool connecting portion 79c. The operator can rotate the rotation shaft 79a by engaging the distal end of the flathead screwdriver with the tool connecting portion 79c.

The tool connecting portion 79d illustrated in FIG. 10 is an H-cut provided at the distal end 79b of the rotation shaft 79a. A socket driver meshing with the H-cut can be connected to the tool connecting portion 79d. The operator can rotate the rotation shaft 79a by engaging the distal end of the socket driver with the tool connecting portion 79d.

According to the present embodiment, each of the tool connecting portions 79c and 79d meshing with a tool for rotating the rotation shaft 79a is provided at the distal end 79b of the rotation shaft 79a. Since the actuator 70 of the present embodiment has a large self-holding torque, the manual shaft 71 cannot be manually operated. According to the present embodiment, the operator can directly rotate the rotation shaft 79a of the motor 79. Therefore, even in the actuator 70 having a large self-holding torque, the state (Locked state or unlocked state) of the parking mechanism 8 can be manually switched.

In addition, according to the present embodiment, since the operator directly rotates the rotation shaft 79a, the state of the parking mechanism 8 can be switched with a small torque. Therefore, a small and versatile tool such as a driver can be used as a tool to be connected to each of the tool connecting portions 79c and 79d, and maintainability is enhanced. In addition, according to the present embodiment, since the rotation shaft 79a can be operated with a small tool, it is possible to make the opening 72w for allowing the tool to access the tool connecting portions 79c and 79d small, and the actuator 70 can be downsized.

Although various embodiments of the present invention are described above, configurations in the embodiments and a combination of the configurations are examples, and thus addition, omission, replacement of a configuration, and other modifications can be made within a range not deviating from the gist of the present invention. Also note that the present invention is not limited by the embodiment.

For example, the power unit of the drive device 1 of the present embodiment, which is the motor, may be an engine. Further, the structure of the gear unit (transmission mechanism) is not limited to that in the description of the present embodiment.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A parking mechanism comprising:
   an actuator having a manual shaft extending along a first axis, the manual shaft being configured to rotate around the first axis;

a flange provided on an outer periphery of the manual shaft and extending along a radial direction of the first axis;
a cam rod including a coupling portion coupled to the flange and a rod body extending along a second axis orthogonal to the first axis, the rod body being configured to move along the second axis and along with a movement of the flange;
a coil spring attached to the rod body;
a cam attached to the rod body and configured to move along the second axis by motion of the rod body transmitting via the coil spring;
a pawl member having a meshing portion and operating with a movement of the cam; and
a parking gear having a tooth portion with which the meshing portion meshes, wherein
an imaginary perpendicular line is set from the first axis to the second axis when viewed in an axial direction of the first axis,
the coupling portion is configured to move around the first axis within a range of ±45° with respect to the perpendicular line,
Formula 1 below holds $$Ts > k \cdot Xb \cdot R \cdot \cos \theta \quad \text{(Formula 1)}$$

where, k is a spring constant of the coil spring,
Xb is a maximum compression amount of the coil spring in a movable range of the rod body,
R is a distance between the first axis and the coupling portion when viewed in the axial direction of the first axis,
θ is an angle formed by the perpendicular line and the coupling portion when viewed in the axial direction of the first axis,
$k \cdot Xb \cdot R \cdot \cos \theta$ is a maximum torque on the manual shaft inputable from the cam rod, and
Ts is a self-holding torque of the actuator, wherein the self-holding torque suppresses rotation of the manual shaft when receiving the maximum torque from the cam rod, and
the parking mechanism excludes a leaf spring.

2. The parking mechanism according to claim 1, further comprising a sleeve into which a distal end of the rod body is inserted, wherein
the cam rod is rotatably supported by the flange at the coupling portion, and is supported by the sleeve at the rod body.

3. The parking mechanism according to claim 1, wherein the actuator includes
a motor having a rotation shaft extending in a direction orthogonal to the first axis,
a worm gear configured to be rotated by the motor provided on an outer periphery of the rotation shaft,
a counter gear unit including a worm wheel that meshes with the worm gear and a small diameter gear that is configured to rotate together with the worm wheel around an axis parallel to the first axis, and
an output gear unit that is fixed to an outer peripheral face of the manual shaft, meshes with the small diameter gear, and is configured to rotate around the first axis.

4. The parking mechanism according to claim 3, wherein a reduction ratio of a power transmission path from the rotation shaft to the manual shaft in the actuator is 1:100 or more.

5. The parking mechanism according to claim 3, wherein the actuator includes a case that accommodates the motor, the worm gear, the counter gear unit, and the output gear unit,
the case has an opening that exposes a distal end of the rotation shaft, and
a tool connecting portion that meshes with a tool that is configured to rotate the rotation shaft is provided at the distal end of the rotation shaft.

6. The parking mechanism according to claim 1, wherein the cam rod has a relay portion that connects the coupling portion with the rod body,
the coupling portion extends in an axial shape along the axial direction of the first axis,
the relay portion extends in an axial shape along the direction orthogonal to the first axis,
the flange includes
a flange body extending along the radial direction of the first axis, and
a protruding portion that protrudes from the flange body along the axial direction of the first axis, and
the protruding portion is disposed closer to the parking gear than the relay portion in an axial direction of the second axis and overlaps with the relay portion when viewed in the axial direction of the second axis.

7. The parking mechanism according to claim 6, wherein the protruding portion has a groove located at a facing surface facing the relay portion and extending along a direction in which the relay portion extends.

8. The parking mechanism according to claim 6, wherein the cam rod
is configured to come into contact with the flange body at the coupling portion and move toward the parking gear along the second axis with a rotational movement of the flange around the first axis in one circumferential direction, and
is configured to come into contact with the protruding portion at the relay portion and move in a direction away from the parking gear along the second axis with a rotational movement of the flange around the first axis in the other circumferential direction.

9. The parking mechanism according to claim 1, further comprising a pawl shaft that extends along a fourth axis orthogonal to the first axis and rotatably supports the pawl member.

10. The parking mechanism according to claim 1, further comprising an abutment member provided on a housing that accommodates the parking mechanism and facing the flange on a rotation track of the flange.

11. The parking mechanism according to claim 1, wherein the coil spring is compressed with the maximum compression amount Xb in a state where the meshing portion is pressed against an outer peripheral face of the tooth portion.

12. The parking mechanism according to claim 1, wherein a distance R between the first axis and the coupling portion when viewed in the axial direction of the first axis is smaller than a dimension of the actuator in a direction in which the perpendicular line extends.

13. A method of assembling a parking mechanism provided in a drive device, wherein
the parking mechanism includes
an actuator having a manual shaft extending along a first axis and rotating around the first axis,
a flange provided on an outer periphery of the manual shaft and extending along a radial direction of the first axis, a cam rod including a coupling portion coupled to the flange, a rod body extending along a second axis orthogonal to the first axis and moving along the second axis and along with a movement of the flange, and a relay portion connecting the coupling portion with the rod body, a sleeve into which a distal end of the rod body is inserted, a coil spring attached to the rod body, a cam that is attached to the rod body and moves along the second axis by motion of the rod body transmitting via the coil spring, a pawl member having a meshing portion and operating with a movement of the cam, and a parking gear having a tooth portion with which the meshing portion meshes, the flange includes a flange body extending along the radial direction of the first axis, and a protruding portion that protrudes from the flange body in a direction parallel to the first axis, and the protruding portion is disposed closer to the parking gear than the relay portion in an axial direction of the second axis and overlaps with the relay portion when viewed in the axial direction of the second axis, the method comprising:

a cam rod coupling step of coupling the cam rod to the flange; and a sleeve attaching step of attaching the sleeve, wherein the sleeve attaching step is performed in a posture in which the second axis is disposed along a vertical direction, and includes supporting the relay portion from below by the protruding portion and inserting the distal end of the rod body into the sleeve.

14. A parking mechanism, comprising:

an actuator having a manual shaft extending along a first axis, the manual shaft being configured to rotate around the first axis;

a flange provided on an outer periphery of the manual shaft and extending along a radial direction of the first axis;

a cam rod including a coupling portion coupled to the flange and a rod body extending along a second axis orthogonal to the first axis, the rod body being configured to move along the second axis and along with a movement of the flange;

a coil spring attached to the rod body;

a cam attached to the rod body and configured to move along the second axis by motion of the rod body transmitting via the coil spring;

a pawl member having a meshing portion and operating with a movement of the cam; and a parking gear having a tooth portion with which the meshing portion meshes, wherein an imaginary perpendicular line is set from the first axis to the second axis when viewed in an axial direction of the first axis, the coupling portion is configured to move around the first axis within a range of ±45° with respect to the perpendicular line, Formula 1 below holds $$Ts > k \cdot Xb \cdot R \cdot \cos \theta \quad \text{(Formula 1)}$$

where, k is a spring constant of the coil spring,

Xb is a maximum compression amount of the coil spring in a movable range of the rod body, R is a distance between the first axis and the coupling portion when viewed in the axial direction of the first axis, θ is an angle formed by the perpendicular line and the coupling portion when viewed in the axial direction of the first axis, $k \cdot Xb \cdot R \cdot \cos \theta$ is a maximum torque on the manual shaft inputable from the cam rod, and Ts is a self-holding torque of the actuator, wherein the self-holding torque suppresses rotation of the manual shaft when receiving the maximum torque from the cam rod, the cam rod has a relay portion that connects the coupling portion with the rod body, the coupling portion extends in an axial shape along the axial direction of the first axis, the relay portion extends in an axial shape along the direction orthogonal to the first axis, the flange includes a flange body extending along the radial direction of the first axis, and a protruding portion that protrudes from the flange body along the axial direction of the first axis, and the protruding portion is disposed closer to the parking gear than the relay portion in an axial direction of the second axis and overlaps with the relay portion when viewed in the axial direction of the second axis.

15. A parking mechanism, comprising:

an actuator having a manual shaft extending along a first axis, the manual shaft being configured to rotate around the first axis;

a flange provided on an outer periphery of the manual shaft and extending along a radial direction of the first axis;

a cam rod including a coupling portion coupled to the flange and a rod body extending along a second axis orthogonal to the first axis, the rod body being configured to move along the second axis and along with a movement of the flange;

a coil spring attached to the rod body;

a cam attached to the rod body and configured to move along the second axis by motion of the rod body transmitting via the coil spring;

a pawl member having a meshing portion and operating with a movement of the cam; and a parking gear having a tooth portion with which the meshing portion meshes, wherein an imaginary perpendicular line is set from the first axis to the second axis when viewed in an axial direction of the first axis, the coupling portion is configured to move around the first axis within a range of ±45° with respect to the perpendicular line, Formula 1 below holds $$Ts > k \cdot Xb \cdot R \cdot \cos \theta \quad \text{(Formula 1)}$$

where, k is a spring constant of the coil spring,

Xb is a maximum compression amount of the coil spring in a movable range of the rod body, R is a distance between the first axis and the coupling portion when viewed in the axial direction of the first axis, θ is an angle formed by the perpendicular line and the coupling portion when viewed in the axial direction of the first axis, $k \cdot Xb \cdot R \cdot \cos \theta$ is a maximum torque on the manual shaft inputable from the cam rod, and Ts is a self-holding torque of the actuator, wherein the self-holding torque suppresses rotation of the manual shaft when receiving the maximum torque from the cam rod, and the park mechanism further comprises an abutment member provided on a housing that accommodates the parking mechanism and facing the flange on a rotation track of the flange.

16. A parking mechanism, comprising:

an actuator having a manual shaft extending along a first axis, the manual shaft being configured to rotate around the first axis;

a flange provided on an outer periphery of the manual shaft and extending along a radial direction of the first axis;

a cam rod including a coupling portion coupled to the flange and a rod body extending along a second axis orthogonal to the first axis, the rod body being configured to move along the second axis and along with a movement of the flange;

a coil spring attached to the rod body;

a cam attached to the rod body and configured to move along the second axis by motion of the rod body transmitting via the coil spring;

a pawl member having a meshing portion and operating with a movement of the cam; and a parking gear having a tooth portion with which the meshing portion meshes, wherein an imaginary perpendicular line is set from the first axis to the second axis when viewed in an axial direction of the first axis, the coupling portion is configured to move around the first axis within a range of ±45° with respect to the perpendicular line, Formula 1 below holds $$Ts > k \cdot Xb \cdot R \cdot \cos \theta \qquad \text{(Formula 1)}$$

where, k is a spring constant of the coil spring,

Xb is a maximum compression amount of the coil spring in a movable range of the rod body, R is a distance between the first axis and the coupling portion when viewed in the axial direction of the first axis, θ is an angle formed by the perpendicular line and the coupling portion when viewed in the axial direction of the first axis, k·Xb·R·cos θ is a maximum torque on the manual shaft inputable from the cam rod, and Ts is a self-holding torque of the actuator, wherein the self-holding torque suppresses rotation of the manual shaft when receiving the maximum torque from the cam rod, and a distance R between the first axis and the coupling portion when viewed in the axial direction of the first axis is smaller than a dimension of the actuator in a direction in which the perpendicular line extends.

* * * * *